United States Patent [19]
Wilson et al.

[11] Patent Number: 5,613,207
[45] Date of Patent: Mar. 18, 1997

[54] METHOD FOR TRANSMITTING MESSAGES IN A COMMUNICATION SYSTEM

[75] Inventors: Alan Wilson, Hoffman Estates; Michael Sasuta, Mundelein, both of Ill.

[73] Assignee: Motorola, Inc., Schaumburg, Ill.

[21] Appl. No.: 250,410

[22] Filed: May 27, 1994

[51] Int. Cl.$^6$ ........................................ H04Q 7/00
[52] U.S. Cl. ................. 455/34.2; 455/34.1; 455/54.2; 379/59
[58] Field of Search .................... 455/54.1, 54.2, 455/53.1, 34.1, 33.1, 56.1, 13.1, 70, 34.2; 379/58, 59, 65; 370/95.2

[56] References Cited

U.S. PATENT DOCUMENTS

| | | | |
|---|---|---|---|
| 4,434,506 | 2/1984 | Fujiwara et al. | 455/53.1 |
| 5,086,507 | 2/1992 | Mela | 455/34.1 |
| 5,235,598 | 8/1993 | Sasuta | 370/110.1 |
| 5,249,304 | 9/1993 | Mulford | 455/34.1 |
| 5,274,842 | 12/1993 | Sasuta | 455/34.1 |
| 5,287,551 | 2/1994 | Gustafson et al. | 455/54.1 |

FOREIGN PATENT DOCUMENTS 8808647  11/1988  WIPO.

Primary Examiner—Reinhard J. Eisenzopf
Assistant Examiner—Lee Nguyen
Attorney, Agent, or Firm—Susan L. Lukasik

[57] ABSTRACT

A method of transmitting messages, where transmitting a message requires a plurality of transmissions, includes communicating control information, e.g., a communication resource allocation request (106) and a communication resource assignment (110), between a controller (101) and a communication unit (104) on a control communication resource (114), such that a working communication resource (115–117) is assigned to the communication unit (104). While the communication unit (104) is engaged in a first transmission of the message on the working communication resource, the control information is communicated between the controller (101) and the communication unit (104) on the working communication resource (115–117), such that the working communication resource (115–117) is assigned to the communication unit (104) for a second transmission of the message.

19 Claims, 2 Drawing Sheets

METHOD FOR TRANSMITTING MESSAGES IN A COMMUNICATION SYSTEM

FIELD OF THE INVENTION

This invention relates to communication systems, including but not limited to trunked radio communication systems.

BACKGROUND OF THE INVENTION

Radio trunked communication systems are known in the art and typically comprise a communication resource controller operably coupled to a predetermined number of communication resources that provide communications to a plurality of communication units. Typically, one of the communication resources is used as a control communication resource, while the other communication resources are used as working communication resources. In most of these systems, the control communication resource is dedicated to only communicate control information between the communication resource controller and the plurality of communication units. A working communication resource is typically used to communicate information such as voice or data between communication units. Two well known techniques that utilize a dedicated control communication resource are commonly known as message trunking and transmission trunking.

With message trunking, a working communication resource is assigned for use for a time greater than that of a single transmission. Thus, a working communication resource, once assigned, is retained for multiple transmissions of a message.

With transmission trunking, a working communication resource is assigned for use for a single transmission only. Subsequent transmissions of the message require new assignments of working communication resource(s), even if the same working communication resource is assigned for a subsequent transmission of the message.

In both of these techniques, when a single communication unit from amongst the plurality of communication units wishes to communicate, the communication unit transmits, on the control communication resource, a communication resource allocation request to the communication resource controller. Upon receiving the communication resource allocation request, and subsequently determining the availability of a working communication resource, the communication resource controller transmits a communication resource assignment of the working communication resource to the communication unit on the control communication resource. The communication unit then affiliates with the working communication resource and makes a first transmission.

With message trunking, when the communication unit completes the first transmission, the working communication resource assignment remains unchanged for a predetermined period of time commonly known as drop-out time. The drop-out time is the time during which a second transmission of this message may begin on the working communication resource. The drop-out time is re-initialized after each transmission, hence, once the working communication resource is assigned, a plurality of transmissions may be made on the working communication resource without utilizing the control communication resource. If the drop-out time expires before a transmission is made, the communication unit returns to the control communication resource and the working communication resource becomes available for re-assignment. To make a transmission after the drop-out time expires, the communication unit must repeat the process of communicating with the communication resource controller to have an available working communication resource assigned, as described above. This method allows efficient use of the control communication resource because a single transmission of a communication resource assignment on the control communication resource allows a plurality of transmissions on a working communication resource. Such a method does not, however, use the working communication resources efficiently as an assigned working communication resource cannot be re-assigned until the drop-out time expires.

With the transmission trunking technique, when the communication unit completes the first transmission on the assigned working communication resource, the communication unit returns to the control communication resource and the working communication resource becomes available for re-assignment almost immediately. Each subsequent transmission requires the steps of transmitting a communication resource allocation request and receiving a communication resource assignment of a working communication resource on the control communication resource, and then affiliating with the working communication resource, as described earlier, before the subsequent transmission may be made. Hence, each transmission utilizes the control communication resource as well as the working communication resource. This method allows efficient use of the working communication resources, as working communication resources are assigned only for the duration of a transmission. Such a method, however, generates a significant amount of traffic on the control communication resource, which in turn limits the number of working communication resources, and hence the number of communication units, that may be supported by the communication resource controller.

Accordingly, a need exists for a method of transmitting messages that utilizes the control communication resource and the working communication resources efficiently.

DESCRIPTION OF A PREFERRED EMBODIMENT

Figure 1:
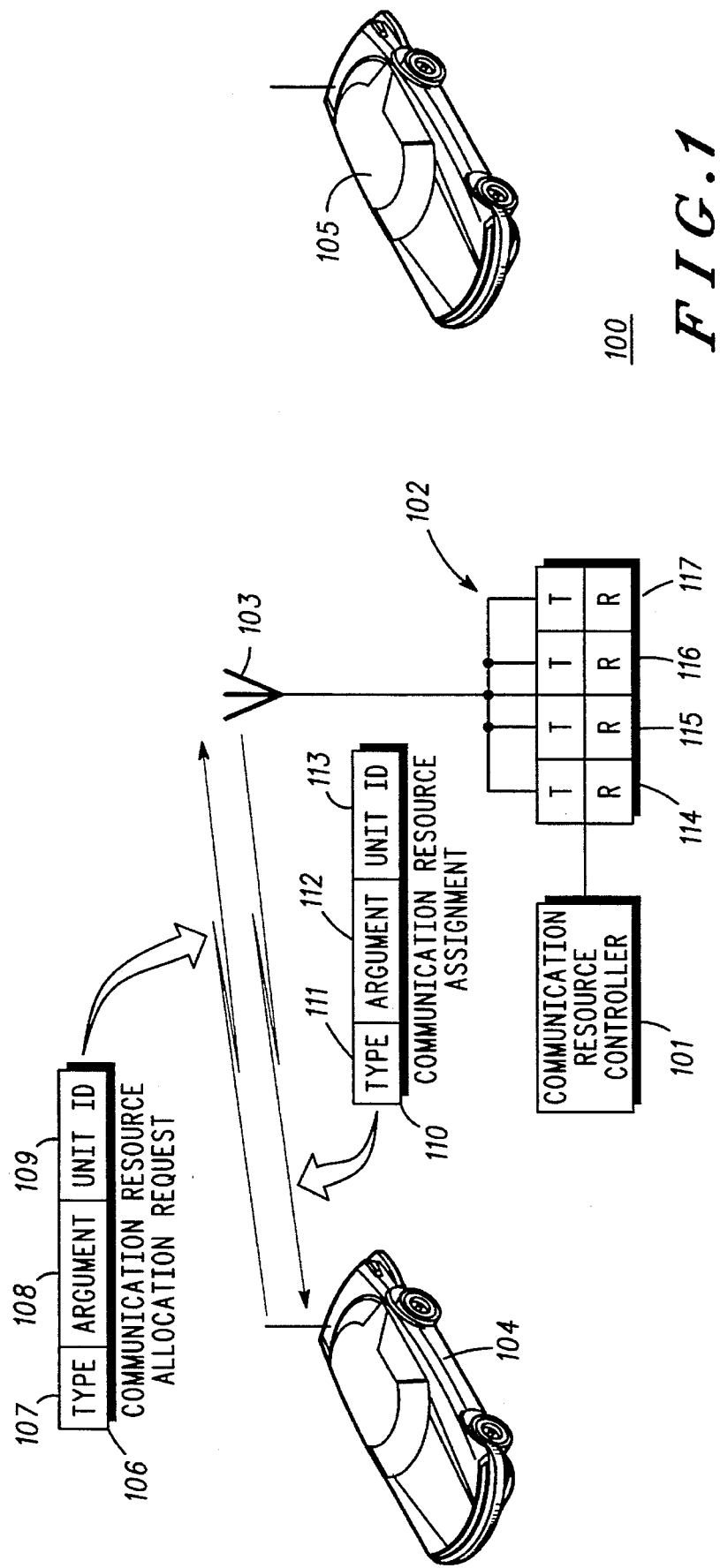
FIG. 1 illustrates a radio trunking communication system in accordance with the present invention.

Generally, the present invention provides a method of transmitting messages in a communication system, where transmitting a message requires a plurality of transmissions. The method is performed by first transmitting a communication resource allocation request, and receiving, via the control communication resource, a working communication resource assignment for use in a following transmission. The communication resource assignment addresses the appropriate communication unit or units to the working communication resource where the first transmission of this message will take place. With the conclusion of the first transmission of the message, subsequent transmissions for this message may be accomplished by signaling the communication resource allocation request on the working communication resource in place of the control communication resource. An appropriate communication resource assignment is presented on the working communication resource to allow the subsequent transmission to commence. With such a method, control information is communicated on a control communication resource to have a working communication resource assigned for a first transmission of a message, and control information is communicated on the working communication resource to have the working communication resources assigned for subsequent transmissions of the message, while retaining the opportunity to assign this working communication resource to satisfy requested service needs other than those of the last assigned communication units at the conclusion of any transmission of this message, which was not provided for in prior art methods.

A method for transmitting messages in a communication system, wherein a message includes a plurality of transmissions, comprises the steps of, when a communication unit is engaged in a first transmission of a message on a working communication resource, transmitting, by the communication unit, a communication resource allocation request on the working communication resource for a second transmission of the message. Upon receiving the communication resource allocation request, a communication resource controller determines whether the working communication resource is available for allocation to the communication unit. When the working communication resource is available for allocation to the communication unit, the communication resource controller transmits, on the working communication resource, a communication resource assignment of the working communication resource to the communication unit, such that the communication unit transmits the second transmission of the message on the working communication resource.

A method for transmitting messages in a communication system, wherein a message includes a plurality of transmissions, comprises the steps of, when a first communication unit of a communication group is engaged in a first transmission of a message on a working communication resource, a second communication unit of the communication group transmits a communication resource allocation request on the working communication resource for a second transmission of the message. Upon receiving the communication resource allocation request, a communication resource controller determines whether the working communication resource is available for allocation to the second communication unit. When the working communication resource is available for allocation to the second communication unit, the communication resource controller transmits on the working communication resource a communication resource assignment of the working communication resource to the second communication unit, such that the second communication unit transmits the second transmission of the message on the working communication resource.

When the working communication resource is not available for allocation to the communication unit, the communication resource controller may transmit, on the working communication resource, a communication resource assignment of another working communication resource to the communication unit, such that the communication unit transmits the second transmission of the message on the another working communication resource. When the working communication resource is not available for allocation to the communication unit, the communication resource controller may transmit, on a control communication resource, a communication resource assignment of another working communication resource to the communication unit, such that the communication unit transmits the second transmission of the message on the another working communication resource. The communication resource assignment of the another working communication resource may be transmitted to another communication unit, such that the another communication unit is able to participate in the message. When no working communication resource is available for allocation to the communication unit, the communication resource controller may transmit, on the working communication resource, a communication resource not available indication to the communication unit.

Figure 2:
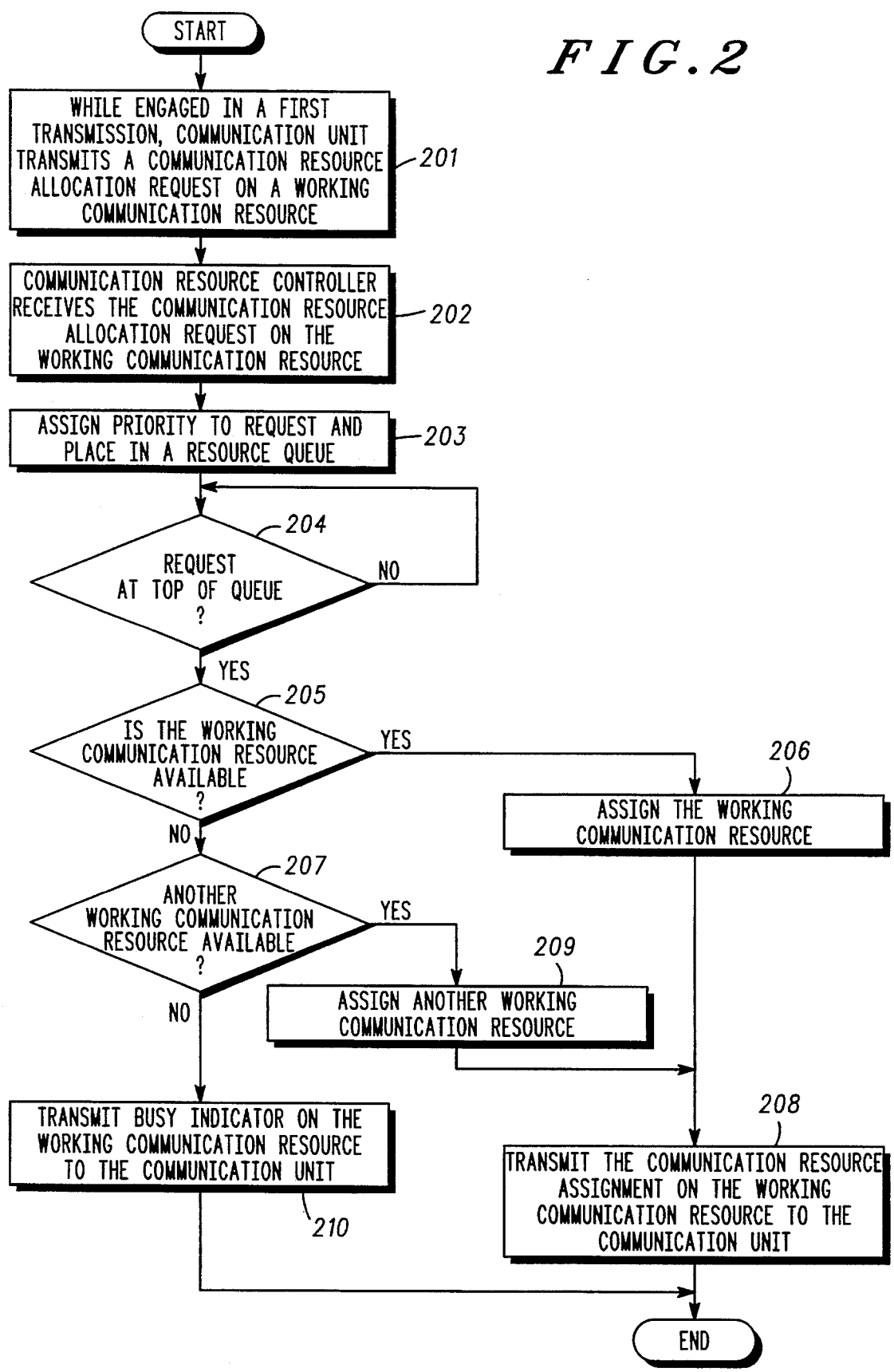
FIG. 2 illustrates a logic diagram detailing the operation of a radio trunking communication system in accordance with the present invention.

The present invention can be more fully described with reference to FIG. 1 and FIG. 2. FIG. 1 illustrates a radio trunking communication system 100, where the individual components are well known in the art and no further detail regarding their operation will be provided here except to further illustrate the present invention. The communication system 100 includes a communication resource controller 101, a plurality of communication units 104 and 105, and a plurality of repeaters 102 operably connected to an antenna system 103. The plurality of repeaters 102, supports a plurality of communication resources 114–117. One of the plurality of communication resources is a control communication resource 114, and the other communication resources are working communication resources 115–117. Typically, control information is transceived between the communications resource controller 101 and the plurality of communication units 104 and 105 on the control communication resource 114. Control information may also be transceived on any of the working communication resources 115–117. Such control information may include a communication resource allocation request 106, a communication resource assignment 110, or other communication system operational information. The communication resource allocation request 106 is transmitted by the communication units 104 and 105 to the communication resource controller 101, and includes, in the preferred embodiment, information such as a type 107, an argument 108, and a unit ID 109. The communication resource assignment 110 is transmitted from the communication resource controller 101 to the communication units 104 and 105, and also includes a type 111, an argument 112, and a unit ID 113. The type 107 and 111 is an opcode identifier that specifies the type of transaction. The argument 108 and 112 provides supplementary information with which to perform the transaction specified by the type 107 and 111. The unit ID 109 and 113 identifies the primary communication unit that is involved in the transaction. For example, in the communication resource allocation request 106, the type 107 may indicate a request for service, while the argument 108 may provide the identities of the communication units that are involved in the service, and the unit ID 109 may identify the communication unit that initiated the request. In the communication resource assignment 110, for example, the type 111 may indicate an assignment to a working communication resource 115–117, while the argument 112 may provide the identity of the working communication resource 115–117 and the identities of other communication units that may be involved in this assignment, and the unit ID 113 may identify the communication unit that requested the resource.

The communications resource controller 101 could be a computer that is programmed to communicate the communication allocation request 106 and the communication resource assignment 110 to the communication units 104 and 105. Similarly, the communication units 104 and 105 may be mobile or portable radios with computers that are programmed to transmit the communication request allocation request 106 and receive the communication resource assignment 110. The communication resource controller 101 and the communication units 104 and 105 may be programmed to comply with a communication system, such as a Motorola SmartNet trunked communication system. The communication unit 104 initiates a service by transmitting a communication resource allocation request 106 to the communication resource controller 101 on the control communication resource 114. Upon receiving the communication resource allocation request 106, the communication resource controller 101 determines the availability of the working communication resources 115–117. When working communication resources 115–117 are not available, prior art methods may be used to process the request. When a working communication resource 115, 116, or 117 is available, however, the communication resource controller 101 transmits a communication resource assignment 110 of the available working communication resource 115, 116, or 117 to the communication unit 104. When the communication unit 104 receives the communication resource assignment 110, the communication unit 104 affiliates with the assigned working communication resource 115, 116, or 117, and makes a first transmission of a message.

When the first transmission of the message on the working communication resource concludes, the communication units assigned to this working communication resource remain on the working communication resource in anticipation of further message transmissions. A communication unit is considered engaged with the communication resource during the transmission proper, as either the active transmitter or a receiver of the transmission, and following the transmission.

If the communication units 104 and 105 detect a working communication resource assignment which does not address those communication units, the communication units leave the working communication resource and resume operation upon the control communication resource. The communication units are then said to be disengaged from the communication resource. Referring now to FIG. 2, while engaged in the first transmission on the working communication resource, a communication unit 104 transmits a communication resource allocation request on the working communication resource to the communication resource controller at step 201. This transmission generally occurs at the conclusion of the preceding transmission, but may overlap the completion of the previous transmission of the message.

The communication resource controller receives the communication resource allocation request on the working communication resource at step 202, then assigns a priority to the request and places the request in a resource queue at step 203. The resource queue could be a First In First Out (FIFO) queue that allows priority queuing, as is well known in the art. With such a queue, a communication resource allocation request communicated on the working communication resource may be assigned a higher priority than a communication resource allocation request communicated on a control communication resource.

When the request is at the top of the resource queue at step 204, and the working communication resource is available at step 205, e.g., no active message assignment for this working communication resource, the working communication resource is assigned to the communication unit at step 206, and the communication resource assignment is transmitted to the communication unit on the working communication resource at step 208. The working communication resource may not be available if the communication resource controller had allocated the working communication resource, based on a communication resource allocation request received on the control channel prior to receiving the request in step 202.

When the working communication resource is not available at step 205, and another working communication resource is available for assignment at step 207, another working communication resource is assigned to the communication unit at step 209, and the communication resource assignment of the another working communication resource is transmitted to the communication unit on the working communication resource at step 208. Alternatively, the communication resource assignment of another working communication resource may be transmitted on the control communication resource. If at step 207 another working communication resource is not available, an indication that no working communication resource is available for this assignment at this time may be transmitted to the communication unit on the working communication resource at step 210. This indication may be referred to as a communication resource not available indication. It is understood that the communication resource assignment of another working communication resource may be transmitted to another communication unit, such that, the other communication unit is able to participate in the message. If performing step 207 is not desired, the process may proceed from step 205 to step 209 and step 210 may be omitted.

Upon receipt of the communication resource assignment, the communication unit affiliates with the assigned working communication resource and makes a second transmission of the message. Steps 201 through 208 may then be repeated until transmission of the message is completed.

The present invention provides a method of transmitting messages composed of multiple transmissions, which utilizes the control communication resource and the working communication resources efficiently. With such a method, the control communication resource is able to support a larger number of working communication resources and as a result a larger number of communication units may be supported on a communication system.

What is claimed is:

1. A method for transmitting messages in a communication system, wherein a message includes a plurality of transmissions, the method comprising the steps of:

a) when a communication unit is engaged in a first transmission of a message on a working communication resource, transmitting, by the communication unit, a communication resource allocation request on the working communication resource for a second transmission of the message;

b) upon receiving the communication resource allocation request, determining, by a communication resource controller, whether the working communication resource is available for allocation to the communication unit; and c) when the working communication resource is available for allocation to the communication unit, transmitting, on the working communication resource by the communication resource controller, a communication resource assignment of the working communication resource to the communication unit, such that the communication unit transmits the second transmission of the message on the working communication resource.

2. The method of claim 1, further comprising the step of, when the working communication resource is not available for allocation to the communication unit, transmitting, on the working communication resource by the communication resource controller, a communication resource assignment of another working communication resource to the communication unit, such that the communication unit transmits the second transmission of the message on the another working communication resource.

3. The method of claim 1, further comprising the step of, when the working communication resource is not available for allocation to the communication unit, transmitting, on a control communication resource by the communication resource controller, a communication resource assignment of another working communication resource to the communication unit, such that the communication unit transmits the second transmission of the message on the another working communication resource.

4. The method of claim 3, further comprising the step of transmitting the communication resource assignment of the another working communication resource to another communication unit, such that the another communication unit is able to participate in the message.

5. The method of claim 1, further comprising the step of, when no working communication resource is available for allocation to the communication unit, transmitting, on the working communication resource by the communication resource controller, a communication resource not available indication to the communication unit.

6. A method for transmitting messages in a communication system, wherein a message includes a plurality of transmissions, the method comprising the steps of:
   a) when a first communication unit of a communication group is engaged in a first transmission of a message on a working communication resource, transmitting, by a second communication unit of the communication group, a communication resource allocation request on the working communication resource for a second transmission of the message;
   b) upon receiving the communication resource allocation request, determining, by a communication resource controller, whether the working communication resource is available for allocation to the second communication unit; and
   c) when the working communication resource is available for allocation to the second communication unit, transmitting, on the working communication resource by the communication resource controller, a communication resource assignment of the working communication resource to the second communication unit, such that the second communication unit transmits the second transmission of the message on the working communication resource.

7. The method of claim 6, further comprising the step of, when the working communication resource is not available for allocation to the second communication unit, transmitting, on the working communication resource by the communication resource controller, a communication resource assignment of another working communication resource to the second communication unit, such that the second communication unit transmits the second transmission of the message on the another working communication resource.

8. The method of claim 6, further comprising the step of, when the working communication resource is not available for allocation to the second communication unit, transmitting, on the control communication resource by the communication resource controller, a communication resource assignment of another working communication resource to the second communication unit, such that the second communication unit transmits the second transmission of the message on the another working communication resource.

9. The method of claim 8, further comprising the step of, when no working communication resource is available for allocation to the second communication unit, transmitting, on the working communication resource by the communication resource controller, a communication resource not available indication for the second communication unit.

10. The method of claim 8, further comprising the step of transmitting the communication resource assignment of the another working communication resource to other communication units in the communication group, such that the other communication units are able to participate in the message.

11. A method for assigning communication resources in a communication system, the method comprising the steps of:
   a) receiving, from a communication unit, a communication resource allocation request on a first working communication resource while the communication unit is engaged in a transmission of a message on the first working communication resource;
   b) determining whether a second working communication resource is available for allocation to the communication unit; and
   c) when the second working communication resource is available for allocation to the communication unit, transmitting, on the first working communication resource, a communication resource assignment of the second working communication resource to the communication unit.

12. The method of claim 11, wherein step (b) further comprises the step of allocating the second working communication resource based on a communication resource allocation request received on a control communication resource prior to receiving the request in step (a), such that the working communication resource is not available.

13. The method of claim 11, further comprising the step of, when the second working communication resource is not available for allocation to the communication unit, transmitting, on the first working communication resource, a communication resource assignment of another working communication resource to the communication unit.

14. The method of claim 13, further comprising the step of transmitting the communication resource assignment of the another working communication resource to another communication unit, such that the another communication unit is able to communicate with the communication unit.

15. The method of claim 11, further comprising the step of, when the second working communication resource is not available for allocation to the communication unit, transmitting, on a control communication resource, a communication resource assignment of another working communication resource to the communication unit.

16. A method for assigning communication resources in a communication system, the method comprising the steps of:
   a) when a first communication unit is engaged in a first transmission of a message on a first working communication resource, transmitting, by the first communication unit, a first communication resource allocation request on the first working communication resource;
   b) transmitting, by a second communication unit, a second communication resource allocation request on a control communication resource;
   c) receiving, on the first working communication resource by the first communication unit, a communication resource assignment of a second working communication resource; d) receiving, on the control communication resource by the second communication unit, a communication resource assignment of a third working communication resource, wherein the second working communication resource and the third working communication resource are different.

17. The method of claim 16, wherein step (c) further comprises the step of receiving, on the first working communication resource, a communication resource assignment of another working communication resource.

18. The method of claim 16, wherein step (c) further comprises the step of receiving, on a control communication resource, a communication resource assignment of another working communication resource.

19. The method of claim 16, wherein step (c) further comprises the step of receiving, on the first working communication resource, a communication resource not available indication.

* * * * *